(12) United States Patent
Nomura et al.

(10) Patent No.: US 6,468,937 B1
(45) Date of Patent: Oct. 22, 2002

(54) SOLID CATALYST COMPONENT AND CATALYST FOR OLEFIN POLYMERIZATION, PROCESS FOR PRODUCING OLEFIN POLYMER AND PROCESS FOR PRODUCING SOLID CATALYST COMPONENT

(75) Inventors: Kotohiro Nomura, Ikoma; Seiki Kiuchi; Tatsuya Miyatake, both of Ichihara, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/281,212

(22) Filed: Mar. 30, 1999

(30) Foreign Application Priority Data

Apr. 6, 1998 (JP) .............................. 10-111498

(51) Int. Cl.$^7$ .......................... B01J 31/00; B01J 37/00; C08F 4/02; C08F 4/60
(52) U.S. Cl. ....................................... 502/109; 502/159
(58) Field of Search .................................. 502/109, 159

(56) References Cited

U.S. PATENT DOCUMENTS

| | | | | |
|---|---|---|---|---|
| 3,737,474 A | * | 6/1973 | Dunn | 502/109 |
| 4,268,418 A | | 5/1981 | Hoff | |
| 4,389,334 A | * | 6/1983 | Weinert, Jr. et al. | 502/109 |
| 5,409,875 A | | 4/1995 | Hsu et al. | 502/109 |
| 6,100,214 A | * | 8/2000 | Walzer, Jr. et al. | 502/109 |
| 6,218,331 B1 | * | 4/2001 | DiMaio et al. | 502/109 |
| 6,281,302 B1 | | 8/2001 | Naga et al. | |
| 6,340,771 B1 | * | 1/2002 | Hoang et al. | 502/159 |

FOREIGN PATENT DOCUMENTS

| | | |
|---|---|---|
| DE | 19829198 | 1/1999 |
| EP | 0633272 A | 6/1994 |
| WO | 9420545 | 9/1994 |

* cited by examiner

*Primary Examiner*—Mark L. Bell
*Assistant Examiner*—J. Pasterczyk
(74) *Attorney, Agent, or Firm*—Stevens, Davis, Miller & Mosher, L.L.P.

(57) ABSTRACT

There are disclosed:

(i) a first solid catalyst component obtained by contacting (a) a carrier of carboxyl group-carrying polymer particles having an average particle size of from about 1 to 200 μm with spherical or elliptical particles morphology (b) an organometallic compound of the number 1, 2 or 13 group of metals in the periodic table of elements, and (c) a transition metal compound of the number 4 group of metals of the periodic table of elements, and a second solid catalyst component obtained by contacting (a), (b), (c) and (d) a phenol compound, and production processes of the two solid catalyst components, (ii) a catalyst obtained by combining the two solid catalyst components with an organoaluminum compound; and (iii) a process for producing an olefin polymer with a catalyst of the invention, wherein the polymer produced is extremely low in its content of lower molecular weight components and low crystallinity components, and superior in its powder properties.

20 Claims, No Drawings

SOLID CATALYST COMPONENT AND CATALYST FOR OLEFIN POLYMERIZATION, PROCESS FOR PRODUCING OLEFIN POLYMER AND PROCESS FOR PRODUCING SOLID CATALYST COMPONENT

FIELD OF THE INVENTION

The present invention relates to a solid catalyst component and a catalyst for olefin polymerization, which are high in their polymerization activity and capable of producing an olefin polymer extremely low in its content of lower molecular weight components and low crystallinity components and superior in its powder properties. The invention also relates to a process for producing an olefin polymer, and a process for producing the solid catalyst component,

BACKGROUND OF THE INVENTION

As a catalyst for olefin polymerization, a Ziegler-Natta catalyst composed of a combination of a transition metal component and an organometal component is well known, and as a high activity catalyst for olefin polymerization, there are proposed many catalysts, for example, those comprising an organoaluminum compound and a solid catalyst component obtained by using a titanium compound and a magnesium compound.

However, these catalysts leave problems such that when they are used for the polymerization of $\alpha$-olefins such as propylene or the copolymerization of ethylene with $\alpha$-olefins, the resulting polymer contains a lot of lower molecular weight components and low crystallinity components which affect a transparency, an impact resistance and a blocking property of the film or sheet obtained by molding the polymer.

With respect to the polymerization of $\alpha$-olefins such as propylene, there are proposed a process comprising incorporating an electron donor such as esters and ethers as an internal donor into a solid catalyst component, and a process comprising incorporating an electron donor such as esters, ethers, amines and organosilicone compounds, as an external donor into a catalyst composed of a solid catalyst component and an organoaluminum compound, whereby the stereospecificity of the resulting polymer is improved to decrease the lower molecular weight components and the low crystallinity components contained in the polymer. Whereas, with respect to the copolymerization of ethylene with $\alpha$-olefins, there are also proposed processes of decreasing the lower molecular weight components and the low ctystallinity components contained in the polymer by using electron donors as the internal or external donor.

However, in the polymerization of $\alpha$-olefins such as propylene, or the copolymerization of ethylene with $\alpha$-olefins, such processes of using electron donors as the internal or external donor are not always satisfactory from a viewpoint of decreasing the production of lower molecular weight components and low crystallinity components.

Meanwhile, in the olefin polymerization, it is desired that the resulting powder polymer is superior in its powder properties, that is, high in its bulk density, narrow in its particle size distribution and superior in its flowability, from a viewpoint of an operational stability and operational efficiency.

In recent years, as a new solid catalyst component, there is known a solid catalyst component obtained by fixing a magnesium compound and a titanium compound on a carrier of a functional group-carrying polymer. For example, WO 94/20545 and U.S. Pat. No. 5,409,875 disclose a process for polymerizing ethylene, wherein an organic solvent solution of an ethylene/unsaturated carboxylic acid copolymer is mixed with a poor solvent to precipitate the copolymer, followed by pulverization to form a carrier, and the carrier is contacted with an organomagnesium compound and a transition metal compound to obtain a solid catalyst component, which is used in combination with an organoaluminum compound for the polymerization of ethylene.

The above catalyst obtained by using the carrier is described in the patent specification to exhibit a high activity also in the copolymerization of ethylene with $\alpha$-olefins. However, the catalyst has been found to be insufficient relating to the content of the lower molecular weight components and the low crystallinity components in the resulting copolymer. Moreover, it has been found that the solid catalyst component obtained by using the carrier contains fine powders to make a particle size distribution broad, and therefore it is not satisfactory also relating to the powder properties of the resulting ethylene/$\alpha$-olefin copolymer.

Each of the references referred to above is incorporated by reference in its entirety.

SUMMARY OF THE INVENTION

An object of the present invention is to provide a solid catalyst component and catalyst for olefin polymerization, which are high in their polymerization activity and capable of producing olefin polymers that are extremely low in their content of lower molecular weight components and low crystallinity components and that are superior in their powder properties.

Another object of the present invention is to provide a process for producing an olefin polymer.

A further object of the present invention is to provide a process for producing the solid catalyst components of the invention.

The present inventors have undertaken extensive studies to accomplish their objects, and, as a result, have found that desired results can be obtained when a carrier of specific carboxyl group-carrying polymer particles is used, and thereby the present invention has been obtained.

The present invention provides a solid catalyst component (A1) for olefin polymerization, which is obtained by contacting:

(a) a carrier of carboxyl group-carrying polymer particles having an average particle size of from about 1 to 200 $\mu$m, (b) an organometallic compound of the number 1, 2 or 13 group of metals in the periodic table of elements, and (c) a transition metal compound of the number 4 group of metals in the periodic table of elements, The present invention also provides a solid catalyst component (A2) for olefin polymerization, which is obtained by contacting:

(a) a carrier of carboxyl group-carrying polymer particles having an average particle size of from about 1 to 200 $\mu$m, (b) an organometallic compound of the number 1, 2 or 13 group of metals in the periodic table of elements, (c) a transition metal compound of the number 4 group of metals in the periodic table of elements, and (d) a phenol compound, The present invention further provides a catalyst for olefin polymerization, which is obtained by using any one of the aforementioned solid catalyst components (A1) and (A2), and at least one compound (B) selected from the group consisting of organoaluminum compounds and organoaluminumoxy compounds.

The present invention further provides a process for producing an olefin polymer, which comprises utilizing said catalyst to catalyze a reaction between olefins, diolefins or a mixture thereof.

The present invention furthermore provides a process for producing the solid catalyst components (A1) and (A2), which comprises contacting the aforementioned (a) to (c), or (a) to (d), respectively.

In the above, groups 1, 2 and 13 in the periodic table of elements are those previously referred to as groups 1a, 2a and 3a, respectively. The group 4 in the periodic table of elements is that previously referred to as group 4b.

DETAILED DESCRIPTION OF THE INVENTION

The following description is not to be construed as limiting the present invention, as those of ordinary skill in the art will realize that various changes can be made in the various materials and procedures taught herein, without departing from the spirit or scope of the present inventive discovery. In this respect, the present invention is only limited by the scope of the claims appended hereto, and the equivalents encompassed thereby. The present invention is explained in detail as follows.

(a) Carrier

The carrier used in the present invention comprises polymer particles containing a polymer having a carboxyl group, and the polymer particles having an average particle size of from about 1 to 200 µm. The polymer particles are preferably spherical or nearly spherical in their shape. Spherical or elliptical particles are particularly preferred. The carrier may be used singly or in a mixture of two or more kinds of polymer particles, and some other polymers may be admixed so far as the objects and effects of the present invention are not impaired. The value relating to the average particle size of the polymer particles is obtained by measuring a slurry of the polymer particles in, for example, water or an alcohol with a particle size measuring apparatus such as COULTER MULTISIZER.

The above polymer having a carboxyl group is not particularly limited. Preferred examples thereof are copolymers comprising carboxyl group-carrying unsaturated monomer units and polymers imparted with a carboxyl group by any chemical or physical modification. The carboxyl group-carrying unsaturated monomers include, for example, unsaturated carboxylic acids such as acrylic acid and methacrylic acid. Of these, acrylic acid is preferred.

Said copolymers comprising carboxyl group-carrying unsaturated monomer units are not particularly limited. Preferred examples thereof are copolymers of ethylene, propylene or styrene with unsaturated monomers having a carboxyl group such as, for example, ethylene/acrylic acid copolymer, ethylene/methacrylic acid copolymer, propylene/acrylic acid copolymer, propylene/methacrylic acid copolymer, styrene/acrylic acid copolymer and styrene/methacrylic acid copolymer.

Among these copolymers, those having ethylene, propylene or styrene units as a main component are preferred. More preferred are those having about 49.9 to 0.1% by weight of carboxyl group-carrying unsaturated monomer units and about 50.1 to 99.9% by weight of ethylene, propylene or styrene units, and much more preferred are those having about 30 to 1% by weight of carboxyl group-carrying unsaturated monomer units and about 70 to 99% by weight of ethylene, propylene or styrene units. Of these, copolymers having about 20 to 5% by weight of acrylic acid or methacrylic acid units and about 80 to 95% by weight of ethylene units are specifically preferred.

Polymers to be imparted with a carboxyl group by any chemical or physical modification are not particularly limited. Preferred examples thereof are polymers having ethylene, propylene or styrene units. More preferred are homopolymers of ethylene, propylene or styrene, and copolymers having ethylene, propylene or styrene units as a main component, and much more preferred are (co) polymers having about 50.1 to 100% by weight of ethylene, propylene or styrene units and about 49.9 to 0% by weight of α-olefin units. Specific examples thereof are polyethylene, ethylene/α-olefin copolymer, polypropylene, propylene/ethylene copolymer, propylene/butene-1 copolymer and polystyrene.

The chemical or physical modification for imparting the carboxyl group to the polymer may be any one known in the art. There are exemplified a process wherein a halogen-containing polystyrene such as styrene/bromostyrene copolymer is treated with an organic alkali metal compound such as n-BuLi and then the resulting product is subjected to reaction with carbon monoxide to obtain styrene/carboxylstyrene copolymer, and a process wherein a polyolefin such as polypropylene and a carboxyl group-carrying unsaturated monomer is melt-kneaded in the presence of an organic peroxide to obtain acrylic acid-modified polypropylene. The carboxyl group-carrying unsaturated monomer used in the latter process includes those mentioned above. Of these, acrylic acid and maleic anhydride are preferred. When acid anhydrides such as maleic anhydride are used, it is recommendable to subject the melt-kneaded product to hydrolysis.

Specific examples of the polymer imparted with a carboxyl group by the chemical or mechanical modification are styrene/carboxylstyrene copolymer, acrylic acid-modified polyethylene, acrylic acid-modified polypropylene, acrylic acid-modified polystyrene, maleic acid-modified polyethylene, maleic acid-modified polypropylene, maleic acid-modified polystyrene, maleic anhydride-modified polyethylene, maleic anhydride-modified polypropylene, maleic anhydride-modified polystyrene and those obtained by hydrolysis of said maleic anhydride-modified polymers.

An average particle size of the polymer particles for the carrier used in the present invention is from about 1 to 200 µm, preferably from about 3 to 100 µm, more preferably from about 5 to 80 µm. A standard deviation relating to the particle distribution of the polymer particles is preferably from about 0.1 to 50 µm, more preferably from about 1 to 30 µm, further preferably from about 3 to 20 µm. By using a carrier of particles having such a relatively uniform particle size, olefin polymers can be obtained which are extremely low in their content of lower molecular weight components and low crystallinity components and superior in their powder property. In the above, the values relating to the average particle size and the standard deviation of the particle distribution are by weight distribution.

The polymer particles used may be those commercially available or those obtained by dispersing carboxyl group-carrying polymers. A technique of dispersing polymers is described in, for example, U.S. Pat. Nos. 3,422,049 and 3,432,483. Each of these references is incorporated by reference in its entirety.

According to the above U.S. Patents, a carboxyl group-carrying polymer, a polar solvent which does not completely dissolve said polymer and a surfactant are mixed with one another under stirring at a high temperature, thereby obtaining polymer particles. In this respect, the temperature is preferably not lower than a melting point of the polymer, providing that the polymer is not decomposed at that temperature, and a pressure is usually from atmospheric to 250 atm. As the polar solvent which does not completely dissolve the polymer, water and an aqueous solvent mainly composed of water are particularly preferred. As the surfactant, a block copolymer of ethylene oxide and propylene oxide is exemplified. The commercially available products mentioned above are usually those produced by this method.

Because the polymer particles. are frequently contaminated with impurities such as surfactants and those by-produced in the course of the polymerization, which affect the polymerization activity of the catalyst, it is recommendable to wash the polymer particles with an organic solvent to remove impurities prior to the practical use. The carrier of the polymer particles thus obtained has advantages such that the shape of the particles is maintained. In this respect, the carrier thus obtained can be differentiated from the carrier obtained by adding a bad solvent to an organic solvent solution of a copolymer to precipitate the copolymer, and pulverizing the precipitated copolymer, as described in the aforesaid WO 94/20545 and U.S. Pat. No. 5,409,875. The catalyst according to the present invention obtained using such a carrier is particularly high in its activity, and can give olefin polymers that are low in their content of lower molecular weight components and low crystallinity components and superior in their powder properties.

The organic solvent used for washing the polymer particles is an organic solvent which does not completely dissolve the polymer particles. Examples thereof are ketone solvents such as acetone, methyl ethyl ketone and methyl isobutyl ketone, nitrile solvents such as acetonitrile, aliphatic hydrocarbon solvents such as pentane, hexane, heptane, octane and decane, aromatic hydrocarbon solvents such as benzene, toluene and xylene, alicyclic hydrocarbon solvents such as cyclohexane and cyclopentane, halogenated hydrocarbon solvents such as 1,2-dichloroethane and monochlorobenzene, and ether solvents such as diethyl ether and tetrahydrofuran. Among these, ketone solvents are preferred, and acetone is particularly preferred from an economical viewpoint.

The washing of polymer particles with the organic solvent can be carried out preferably in a manner such that the polymer particles are slurried with the organic solvent at a temperature at which the polymer particles are not completely dissolved and the shape thereof can be maintained, and after stirring for about 1 minute to 10 hours, the slurry is filtered to separate the particles, which are then dried. The slurrying temperature is usually from about −30 to 100° C., preferably from about 0 to 80° C., more preferably from about 20 to 60° C., and the drying is carried out preferably at about 5 to 60° C. for about 10 minutes to 10 hours under reduced pressure.

(b) Organometallic Compound

The organometallic compounds used in the present invention are those of a metal belonging to the 1, 2 or 13 group of elements in the periodic table of the elements. Among them, organometallic compounds of a metal belonging to the 1 or 2 group are preferred. More preferred are organomagnesium compounds and much more preferred are dihydrocarbylmagnesium compounds.

The 1 group metal of the periodic table includes, for example, lithium, sodium and potassium, and the organometallic compounds of said metal includes, for example, hydrocarbyllithium, hydrocarbylsodium and hydrocarbylpotassium. Of these, hydrocarbyllithium compounds such as methyllithium, ethyllithium and butyllithium are preferred.

The 2 group metal of the periodic table includes, for example, magnesium and calcium, and the organometallic compounds of said metal includes, for example, dihydrocarbylmagnesium, hydrocarbylmagnesium halide and dihydrocarbylcalcium.

The dihydrocarbylmagnesium is represented by the following formula,

wherein $R^1$ and $R^2$ may be the same and different, and denote a hydrocarbon group having 1 to 20 carbon atoms. The hydrocarbon group denoted by $R^1$ and $R^2$ includes preferably alkyl, aryl, aralkyl and alkenyl groups, and specific examples thereof are methyl, ethyl, n-propyl, iso-propyl, n-butyl, sec-butyl, tert-butyl, iso-amyl, hexyl, octyl, 2-ethylhexyl, phenyl and benzyl groups. Of these dihydrocarbylmagnesium compounds, diethylmagnesium, n-butylethylmagnesium and di-n-butylmagnesium are preferably used. These dihydrocarbylmagnesium compounds may be used in the form of a mixture with a trialkylaluminum mentioned below.

The hydrocarbylmagnesium halides are in general called a Grignard reagent, and usually represented by the following formula,

wherein $R^3$ is a hydrocarbon group having 1 to 20 carbon atoms, and Y is a halogen atom. Examples of the hydrocarbon group denoted by $R^3$ are similar to those of $R^1$ and $R^2$. The halogen atom denoted by Y includes, for example, fluorine, chlorine, bromine and iodine atoms. Of these, chlorine and bromine atoms are preferred. Specific examples of the hydrocarbylmagnesium halides are methylmagnesium chloride, methylmagnesium bromide, methylmagnesium iodide, ethylmagnesium chloride, ethylmagnesium bromide, n-butylmagnesium chloride, n-butylmagnesium bromide, cyclohexylmagnesium chloride, allylmagnesium chloride, phenylmagnesium chloride, phenylmagnesium bromide, and benzylmagnesium chloride. Of these, methylmagnesium chloride, methylmagnesium bromide, n-butylmagnesium chloride, n-butylmagnesium bromide and phenylmagnesium chloride are preferred.

The 13 group metal of the periodic table includes, for example, aluminum and gallium, and the organometallic compounds of said metal includes, for example, organoaluminum, organoaluminum halides and organoaluminum hydrides. Examples of the organoaluminum are trimethylaluminum, triethylaluminum and triisobutylaluminum, examples of the organoaluminum halides are dimethylaluminum chloride, dimethylaluminum bromide, diethylaluminum chloride, diisobutylaluminum chloride, methylaluminum dichloride, ethylaluminum dichloride, isobutylaluminum dichloride and ethylaluminum sesquichloride, and examples of the organoaluminum hydrides are diethylaluminum hydride and diisobutylaluminum hydride.

(c) Transition Metal Compound

The transition metal compound of the 4 group metal of the periodic table of the elements used in the present invention includes, for example, titanium compounds, zirconium compounds and hafnium compounds. Of these, titanium compounds, particularly those represented by the following formula, are preferred,

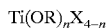
$$Ti(OR)_n X_{4-n}$$

wherein R is an alkyl group having 1 to 4 carbon atoms, X is a chlorine, bromine or iodine atom, and n is 0 or an integer of 1 to 3.

Specific examples of the titanium compounds represented by the above formula are tetrahalogeno titanium compounds such as titanium tetrachloride, titanium tetrabromide and titanium tetraiodide, trihalogeno alkoxytitanium compounds such as methoxytitanium trichloride, ethoxytitanium trichloride, butoxytitanium trichloride, phenoxytitanium trichloride and ethoxytitanium tribromide, dihalogeno dialkoxytitanium compounds such as dimethoxytitanium dichloride, diethoxytitanium dichloride, dibutoxytitanium dichloride, diphenoxytitanium dichloride and diethoxytitanium dibromide, monohalogeno trialkoxytitanium compounds such as trimethoxytitanium chloride, triethoxytitanium chloride, tributoxytitanium chloride, triphenoxytitanium chloride and triethoxytitanium bromide, and tetraalkoxytitanium compounds such as tetramethoxytitanium, tetraethoxytitanium and tetraphenoxytitanium. Of these, tetrahalogeno titanium compounds are preferred, and titanium tetrachloride is particularly preferred.

(d) Phenol Compound

The phenol compound used in the present invention includes those substituted or unsubstituted. Phenol compounds having a substituent at least at 2-position are preferred, and those having substituents at least at 2 and 6-positions are particularly preferred. Preferred substituents are a halogen atom and alkyl, aralkyl, aryl, silyl, alkoxy, aralkoxy, aryloxy and silyloxy groups, which are substituted or unsubstituted with a halogen atom.

Specific examples of the phenol compounds are 2-substituted phenols such as 2-methylphenol, 2-ethylphenol, 2-n-butylphenol, 2-iso-butylphenol, 2-t-butylphenol, 2-n-propylphenol, 2-iso-propylphenol, 2-phenylphenol, 2-fluorophenol, 2-chlorophenol and 2-bromophenol, 2,6-substituted phenols such as 2,6-dimethylphenol, 2,6-diethylphenol, 2,6-di-n-butylphenol, 2,6-di-iso-butylphenol, 2,6-di-t-butylphenol, 2,6-di-n-propylphenol, 2,6-di-iso-propylphenol, 2,6-diphenylphenol, 2,6-difluorophenol, 2,6-dichlorophenol and 2,6-dibromophenol, and 2,6,X-substituted phenols (X is a number selected from 3, 4 and 5) such as 2,4,6-trimethylphenol, 2,6-di-t-butyl-4-methylphenol and pentafluorophenol.

Preferred phenol compounds are 2-methylphenol, 2-ethylphenol, 2-n-butylphenol, 2-iso-butylphenol, 2-t-butylphenol, 2-n-propylphenol, 2-iso-propylphenol, 2-phenylphenol, 2,6-dimethylphenol, 2,6-diethylphenol, 2,6-di-n-butylphenol, 2,6-di-iso-butylphenol, 2,6-di-t-butylphenol, 2,6-di-n-propylphenol, 2,6-di-iso-propylphenol and 2,6-diphenyphenol.

More preferred phenol compounds are 2-, 2,6- or 2,6,X(X is as defined above)-substituted phenols having a branch-carrying alkyl, cycloalkyl or aryl group.

(A) Solid Catalyst Component

The solid catalyst component for olefin polymerization in accordance with the present invention is a solid catalyst component (A1) obtained by contacting the carrier (a), the organometallic compound (b) and the transition metal compound (c) with one another. Another solid catalyst component for olefin polymerization in accordance with the present invention is a solid catalyst component (A2) obtained by contacting the carrier (a), the organometallic compound (b), the transition metal compound (c) and the phenol compound (d) with one another. In the above, it is preferred to use the phenol compound (d) from a viewpoint of decreasing the production of the lower molecular weight components and the low crystallinity components. The obtained solid catalyst component is preferably stored in a cool and dark place under an inert gas atmosphere such as nitrogen and argon.

Contacting order of the components (a) to (d) is not limited. It is particularly preferred to carry out a first contact of (a) with (b), and a second contact of the first contact product with (c), in this order. In case where (d) is used, it is particularly preferred to carry out a first contact of (a) with (b), a second contact of the first contact product with (c), and a third contact of the second contact product with (d). These contacts may be carried out continuously or preferably in a manner such that the respective resulting products are washed with a solvent before subjecting to successive contact. Contacting time for each contact is not particularly limited and usually from about 5 minutes to 24 hours.

The contacts of respective components are preferably carried out in a slurry state in the presence of a solvent at a temperature, at which the shape of the carrier can be maintained, and under atmosphere of an inert gas such as nitrogen and argon. The temperature ranges usually from about −30 to 100° C., preferably from about 0 to 80° C., more preferably from about 20 to 60° C. The solvent includes, for example, aliphatic hydrocarbons such as pentane, hexane, heptane, octane and decane, aromatic hydrocarbons such as benzene, toluene and xylene, alicyclic hydrocarbons such as cyclohexane and cyclopentane, halogeno hydrocarbons such as 1,2-dichloroethane and monochlorobenzene, and ether compounds such as diethyl ether, dibutyl ether, diisoamyl ether and tetrahydrofuran. Preferred solvents are aliphatic hydrocarbons and aromatic hydrocarbons, and more preferred are hexane, heptane, octane, toluene and xylene.

With respect to amounts of respective components, the amount of the organometallic compound to be used is usually from about 0.1 to 100 times, preferably from about 0.1 to 10 times, that of the carboxyl group in the carrier in terms of a molar ratio, and the amount of the transition metal compound to be used is usually from about 0.1 to 100 times, preferably from about 0.1 to 10 times, that of the organometallic compound in terms of a molar ratio. Moreover, the amount of the phenol compound to be used is usually from about 0.1 to 100 times, preferably from about 0.1 to 10 times, that of the transition metal compound fixed on the carrier.

(B) Organoaluminum Compound and Organoaluminumoxy Compound

The catalyst for olefin polymerization in accordance with the present invention is that obtained by using the solid catalyst component (A) as mentioned above and at least one compound (B) selected from the group consisting of organoaluminum compounds and organoaluminumoxy compounds.

The organoaluminum compounds are those having at least one Al—C bond in the molecule, and, for example, represented by the following formula,

$$R^4_n AlZ_{3-n}$$

wherein $R^4$ is an alkyl group having 1 to 10 carbon atoms, Z is a halogen or hydrogen atom, and n is a number satisfying $0 < n \leq 3$. Specific examples thereof are trimethylaluminum, triethylaluminum, tri-n-propylaluminum, tri-n-butylaluminum, tri-isobutylaluminum, tri-tert-butylaluminum, tri-isopropylaluminum, tripentylaluminum, tri-n-hexylaluminum, tri-(2-methylpentyl)aluminum, tri-n-octylaluminum, diethylaluminum hydride, di-iso-butylaluminum hydride, methylaluminum sesquichloride, ethylaluminum sesquichloride, isobutylaluminum sesquichloride, dimethylaluminum chloride, diethylaluminum chloride, di-n-propylaluminum chloride, di-n-butylaluminum chloride, di-isobutylaluminum chloride, di-tert-butylaluminum chloride, di-iso-propylaluminum chloride, di-pentylaluminum chloride, methylaluminum dichloride, ethylaluminum dichloride, isobutylaluminum dichloride, tert-butylaluminum dichloride, isopropylaluminum dichloride and pentylaluminum dichloride. Of these, diethylaluminum chloride, triethylaluminum and triisobutylaluminum are preferably used.

As the organoaluminumoxy compounds, those known in the art as aluminoxan compounds can be used. For example, those obtained by the reaction between one kind of trialkylaluminum and water and those obtained by condensation between two or more kinds of trialkylaluminum and water are used. Specific examples of the organoaluminumoxy compound are methylaluminoxan, ethylaluminoxan, propylaluminoxan, butylaluminoxan, isobutylaluminoxan, methylethylaluminoxan, methylbutylaluminoxan and methylisobutylaluminoxan. Of these, methylaluminoxan, isobutylaluminoxan and methylisobutylaluminoxan are particularly preferred.

The solid catalyst component for olefin polymerization used in the present invention may be those obtained through a pre-polymerization. The pre-polymerization can be carried out, for example, by contacting the aforementioned solid catalyst component and organoaluminum compound and an olefin with one another. The olefin includes, for example, ethylene, propylene and butene-1. The pre-polymerization may be either homopolymerization or copolymerization.

In carrying out the pre-polymerization, the solid catalyst component is preferably slurried with a solvent. The solvent includes, for example, aliphatic hydrocarbons such as butane, pentane, hexane and heptane, and aromatic hydrocarbons such as toluene and xylene.

In the pre-polymerization, it is preferred to use the organoaluminum compound in a proportion of from about 0.1 to 100, preferably from about 1 to 10, in terms of Al/Ti molar ratio. A pre-polymerization temperature is from about −30 to 80° C., preferably from about −10 to 50° C., and a pre-polymerization amount ranges from about 0.1 to 100 g, preferably from about 0.5 to 50 g per g of the solid catalyst component.

Production of Olefin Polymer

In the production process of an olefin polymer in accordance with the present invention, the solid catalyst component (A) subjected to pre-polymerization, or not, and at least one compound (B) selected from the group consisting of the organoaluminum compounds and the organoaluminumoxy compounds (hereinafter, referred to simply as the organoaluminum compound (B)) are fed to a polymerization vessel. The feeding is, for example, carried out in a water-free state under atmosphere of an inert gas such as nitrogen and argon in the presence of an olefin. Here, the solid catalyst component (A) and the organoaluminum compound (B) may be fed thereto independently of each other, or they may be contacted with each other in advance and then fed thereto. In addition, a chain transfer agent such as hydrogen can be added thereto to regulate a molecular weight of the olefin polymer.

An amount of the organoaluminum compound (B) in terms of mole of the aluminum atom contained therein is from about 1 to 10000 moles, preferably from about 1 to 3000 moles per mole of the transition metal atom contained in the solid catalyst component (A).

In producing the olefin polymer, a known electron donor and hydrogen may be used. The electron donor includes, for example, an organic compound having an Si—OR bond in the molecule, R being a hydrocarbon group having 1 to 20 carbon atoms.

Specific examples of the Si—OR bond-carrying organic compound are tetramethoxysilane, dimethyldimethoxysilane, tetraethoxysilane, triethoxysilane, diethoxydiethylsilane, ethoxytriethylsilane, tetra-iso-propoxysilane, di-iso-propoxy-di-iso-propylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, poly(dimethylsiloxane), poly(diphenylsiloxane), poly(methylhydrosiloxane) and poly(phenylhydrosiloxane).

The olefin usable in the production process of the olefin polymer in accordance with the present invention includes, for example, olefins and diolefins having 2 to 20 carbon atoms. Two or more of these olefins can be used simultaneously. Specific examples thereof are ethylene, propylene, butene-1, pentene-1, hexene-1, heptene-1, octene-1, nonene-1, decene-1, 4-methyl-pentene-1 and vinylcyclohexene. A combination of an olefin with the other to obtain an olefin copolymer includes, for example, ethylene with propylene, ethylene with butene-1, ethylene with hexene-1, ethylene with octene-1, and propylene with butene-1.

Preferred examples of the olefin polymer obtained by the production process of the olefin polymer in accordance with the present invention are copolymers of ethylene with α-olefins such as a copolymer of ethylene with propylene, a copolymer of ethylene with butene-1, a copolymer of ethylene with hexene-1 and a copolymer of ethylene with octene-1.

A polymerization temperature is usually from about −30 to 300° C., preferably from about 20 to 250° C., more preferably from about 20 to 100° C., providing that the temperature is not higher than that, at which the olefin polymer is melt. A polymerization pressure is not particularly limited, and a pressure of from atmospheric pressure to 150 atm. is preferred from an industrial and economical point of view. A polymerization time can be determined generally depending on the kind of the polymer to be obtained and the reaction apparatus, and usually ranges from about 5 minutes to 40 hours.

The polymerization process may be carried out as a continuous or batchwise process. A slurry or solvent polymerization with use of inert solvents such as propane, pentane, hexane, heptane and octane, and a liquid phase or vapor phase polymerization with use of no solvent can be applied. The catalyst for the olefin polymerization in accordance with the present invention is particularly suitable for a slurry polymerization and a vapor phase polymerization.

According to the present invention by using a specific carrier of carboxyl group-carrying polymer particles, there can be provided a solid catalyst component and catalyst for olefin polymerization, which are high in their polymerization activity and capable of producing an olefin polymer extremely low in its content of lower molecular weight components and low crystallinity components and superior in its powder properties.

Further, according to the present invention, there can be provided a process for producing such a solid catalyst component with high efficiency, and a process for producing an olefin polymer with high efficiency, the polymer obtained being extremely low in its content of lower molecular weight components and low crystallinity components and superior in its powder properties.

The present invention is explained in more detail with reference to the following Examples, which are only illustrative and not to be construed to limit the scope of the present invention. The measurement values relating to particulars in the Examples were obtained in the following manners.

1. Ti Content in Catalyst

Measured according to ICP emission analysis using Optima 3000 manufactured by Perkin Elmer Ltd.

2. Content of α-olefin

Measured from the absorption characteristics of ethylene and the α-olefin using an infrared spectrophotometer, IR-810, manufactured by Japan Spectroscopic Co., LTD., and expressed in terms of a short chain branch number (SCB) per 1000 C (carbon atom).

3. Melt Flow Rate (MFR)

Measured at 190° C. according to ASTM D1238.

4. Melt Flow Rate Ratio (MFRR)

MFRR was shown in terms of a ratio of the melt flow rate (MFR) measured at 190° C. according to ASTM D1238 and that measured similarly, providing that the load applied was changed to 21.60 kg, namely,

*MFRR*=(melt flow rate when the load was 21.60 kg)÷(melt flow rate when the load was 2.160 kg).

5. Lower Molecular Weight Components, Low Crystallinity Components

Evaluated by a quantity (CXS, % by weight) of soluble portions when the polymer was mixed with a cold xylene of 25° C. In general, the CXS value tends to increase with an increase of the SCB value.

EXAMPLE 1

(1) Washing of Polymer Particles

In a 200 ml round bottom flask purged with nitrogen gas and equipped with a stirrer, 10 g of an ethylene/acrylic acid copolymer (trade mark: FLOW BEADS, manufactured by Sumitomo Seika Chemicals Co., acrylic acid content: 7.0% by weight, average particle size: 26 μm, standard deviation of particle distribution: 15 μm) and 100 ml of acetone were fed, and stirred for 10 minutes at room temperature. Thereafter, the polymer particles were separated by filtration using a glass filter. In the round bottom flask, the polymer particles separated and 100 ml of acetone were fed and treated again in the same manner as above. The polymer particles recovered were dried at 40° C. for 3 hours under reduced pressure. The amount of the polymer particles recovered was almost the same as the amount fed. It was microscopically confirmed that the shape of the polymer particles was maintained.

(2) Production of Solid Catalyst Component

In a 100 ml round bottle flask thoroughly purged with nitrogen gas and equipped with a stirrer, 2.0 g of the ethylene/acrylic acid copolymer washed in the above (1) and 40 ml of n-hexane were fed, and 15 ml of a n-hexane solution of 8.0 mmol of n-butylethylmagnesium was added dropwise thereto over 15 minutes. The mixture was stirred at 40° C. for 2 hours. After the reaction was over, the reaction mixture was filtered to separate a solid, which was washed twice with 40 ml of n-hexane. Successively, the solid was mixed with 40 ml of n-hexane, and a solution of 2.2 ml of titanium tetrachloride in 15 ml of n-hexane was added dropwise thereto. The mixture was stirred at 40° C. for 1 hour. After the reaction was over, the reaction mixture was filtered to separate a solid, which was washed three times with 40 ml of n-hexane, and thereafter dried at room temperature for 2 hours under reduced pressure, thereby obtaining a solid catalyst component (I). The Ti content in the solid catalyst component (I) was found to be 0.13 mmol/g. It was microscopically confirmed that the shape of the polymer particles in the solid catalyst component produced was maintained.

(3) Ethylene/butene-1 Copolymerization

A 400 ml stainless-made pressure reaction tube thoroughly purged with nitrogen gas and equipped with a stirrer was held in reduced pressure, and 20 g of butene-1 and 80 g of n-butane were fed therein. The temperature in the system was raised to 70° C., and then 2.5 kg/cm² of hydrogen and 6 kg/cm² of ethylene were fed therein. The mixture was stirred for a while until the system reached saturation. A solution prepared by dissolving 1.0 mmol of triisobutylaluminum in 1.0 ml of n-heptane and a solution prepared by suspending 14.6 mg of the solid catalyst component (I) obtained above in 5 ml of n-heptane were fed in this order under a pressure of argon to initiate polymerization. One hour after, ethanol was fed in the reaction system to discontinue the polymerization, and unreacted gases were purged to recover a copolymer. The copolymer recovered was dried at 60° C. for 4 hours under reduced pressure to obtain 14.3 g of ethylene/butene-1 copolymer. With respect to the copolymer obtained, SCB, MFR, MFRR and CXS were found to be 21.33 (/1000 C.), 2.26 (g/10 min.), 29.1 and 7.6 wt %, respectively. It was microscopically confirmed that the copolymer obtained was spherical like the solid catalyst component used, narrow in its particle distribution and superior in its powder properties.

EXAMPLE 2

(1) Production of Solid Catalyst Component

In a 100 ml round bottle flask thoroughly purged with nitrogen gas and equipped with a stirrer, 2.0 g of the ethylene/acrylic acid copolymer washed in Example 1 (1) and 40 ml of n-hexane were fed, and 15 ml of a n-hexane solution of 8.0 mmol of n-butylethylmagnesium was added dropwise thereto over 15 minutes. The mixture was stirred at 40° C. for 2 hours. After the reaction was over, the reaction mixture was filtered to separate a solid, which was washed twice with 40 ml of n-hexane. Successively, the solid was mixed with 40 ml of n-hexane, and a solution of 2.2 ml of titanium tetrachloride in 15 ml of n-hexane was added dropwise thereto. The mixture was stirred at 60° C. for 1 hour. After the reaction was over, the reaction mixture was filtered to separate a solid, which was washed three times with 40 ml of hexane, and thereafter dried at room temperature for 2 hours under reduced pressure, thereby obtaining a solid catalyst component (II). The Ti content in the solid catalyst component (II) was found to be 0.1 mmol/g.

(2) Ethylene/butene-1 Copolymerization

Example 1 (3) was repeated, except that the amount of hydrogen was changed to 2 kg/cm², and 12.1 mg of the solid catalyst component (II) was used in place of the solid catalyst component (I).

As a result, 5.8 g of ethylene/butene-1 copolymer was obtained. With respect to the copolymer obtained, SCB, MFR, MFRR and CXS were found to be 17.91 (/1000 C.), 0.98 (g/10 min.), 27.2 and 4.9 wt %, respectively. The powder properties of the copolymer obtained were found to be superior.

EXAMPLE 3

(1) Production of Solid Catalyst Component

In a 300 ml round bottle flask thoroughly purged with nitrogen gas and equipped with a stirrer, 6.0 g of the ethylene/acrylic acid copolymer prepared in Example 1 (1) and 120 ml of n-heptane were fed, and 30 ml of a n-heptane solution of 24.0 mmol of n-butylethylmagnesium was added dropwise thereto over 30 minutes. The mixture was stirred at 40° C. for 2 hours. After the reaction was over, the reaction mixture was filtered to separate a solid, which was washed three times with 100 ml of n-heptane. Successively, the solid was mixed with 120 ml of n-heptane, and a solution of 6.6 ml of titanium tetrachloride in 20 ml of n-heptane was added dropwise thereto over 30 minutes. The mixture was stirred at room temperature for 1 hour. After the reaction was over, the reaction mixture was filtered to separate a solid, which was washed three times with 100 ml of hexane, and thereafter dried at room temperature for 2 hours under reduced pressure, thereby obtaining a solid catalyst component (III).

(2) Ethylene/butene-1 Copolymerization

Example 1 (3) was repeated, except that the amounts of butene-1, n-butane and hydrogen were changed to 23 g, 77 g and 2 kg/cm$^2$, respectively, and 8.6 mg of the solid catalyst component (III) was used in place of the solid catalyst component (I).

As a result, 6.4 g of ethylene/butene-1 copolymer was obtained. With respect to the copolymer obtained, SCB, MFR, MFRR and CXS were found to be 19.70 (/1000 C.), 0.54 (g/10 min.), 29.0 and 6.8 wt %, respectively. The powder properties of the copolymer obtained were found to be superior.

EXAMPLE 4

(1) Washing of Polymer Particles

A washing treatment was carried out according to Example 1 (1), except that an ethylene/acrylic acid copolymer having an average particle size of 25 μm and a standard deviation of particle distribution of 15 μm (trade mark:FLOW BEADS, manufactured by Sumitomo Seika Chemicals Co., acrylic acid content: 7.0% by weight) was used.

(2) Production of Solid Catalyst Component

In a 100 ml round bottle flask thoroughly purged with nitrogen gas and equipped with a stirrer, 2.06 g of the ethylene/acrylic acid copolymer washed in the above (1) and 41 ml of n-heptane were fed, and 20 ml of a n-heptane solution of 8.24 mmol of n-butylethylmagnesium was added dropwise thereto over 20 minutes. The mixture was stirred at 40° C. for 2 hours. After the reaction was over, the reaction mixture was filtered to separate a solid, which was washed three times with 40 ml of n-heptane. Successively, the solid was mixed with 41 ml of n-heptane, and a solution of 2.27 ml of titanium tetrachloride in 15 ml of n-hexane was added dropwise thereto. The mixture was stirred at room temperature for 1 hour. After the reaction was over, the reaction mixture was filtered to separate a solid, which was washed three times with 40 ml of hexane, and thereafter dried at room temperature for 2 hours under reduced pressure, thereby obtaining a solid catalyst component (IV). A Ti content in the solid catalyst component (IV) was found to be 0.18 mmol/g.

(3) Ethylene/butene-1 Copolymerization

Example 1 (3) was repeated, except that the amount of hydrogen was changed to 2.5 kg/cm$^2$, and 13.1 mg of the solid catalyst component (IV) was used in place of the solid catalyst component (I).

As a result, 6.0 g of ethylene/butene-1 copolymer was obtained. With respect to the copolymer obtained, SCB, MFR, MFRR and CXS were found to be 17.46 (/1000 C.), 0.42 (g/10 min.), 34 and 4.5 wt %, respectively. The powder properties of the copolymer obtained were found to be superior.

EXAMPLE 5

(1) Washing of Polymer Particles

A washing treatment was carried out according to Example 1 (1), except that an ethylene/acrylic acid copolymer having an average particle size of 11 μm and a standard deviation of particle distribution of 5 μm (trade mark:FLOW BEADS, manufactured by Sumitomo Seika Chemicals Co., acrylic acid content: 7.0% by weight) was used.

(2) Production of Solid Catalyst Component

In a 100 ml round bottle flask thoroughly purged with nitrogen gas and equipped with a stirrer, 2.0 g of the ethylene/acrylic acid copolymer washed in the above (1) and 40 ml of n-heptane were fed, and 10 ml of a n-heptane solution of 8.0 mmol of n-butylethylmagnesium was added dropwise thereto at 0 to 5° C. over 30 minutes. The mixture was stirred at 40° C. for 2 hours. After the reaction was over, the reaction mixture was filtered to separate a solid, which was washed three times with 40 ml of n-heptane. Successively, the solid was mixed with 40 ml of n-heptane, and a solution of 2.2 ml of titanium tetrachloride in 10 ml of n-heptane was added dropwise thereto. The mixture was stirred at room temperature for 1 hour. After the reaction was over, the reaction mixture was filtered to separate a solid, which was washed three times with 50 ml of hexane, and thereafter dried at room temperature for 2 hours under reduced pressure, thereby obtaining a solid catalyst component (V). The Ti content in the solid catalyst component (V) was found to be 0.41 mmol/g.

(3) Ethylene/butene-1 Copolymerization

Example 1 (3) was repeated, except that the amount of hydrogen was changed to 1.5 kg/cm$^2$, and 5.6 mg of the solid catalyst component (V) was used in place of the solid catalyst component (I).

As a result, 8.5 g of ethylene/butene-1 copolymer was obtained. With respect to the copolymer obtained, SCB, MFR, MFRR and CXS were found to be 18.19 (/1000 C.), 0.80 (g/10 min.), 28.1 and 5.5 wt %, respectively. The powder properties of the copolymer obtained were found to be superior.

EXAMPLE 6

(1) Production of Solid Catalyst Component

In a 100 ml round bottle flask thoroughly purged with nitrogen gas and equipped with a stirrer, 2.25 g of the ethylene/acrylic acid copolymer prepared in Example 5 (1) and 45 ml of n-heptane were fed, and 10 ml of a n-heptane solution of 9.0 mmol of n-butylethylmagnesium was added dropwise thereto at room temperature over 30 minutes. The mixture was stirred at 40° C. for 2 hours. After the reaction was over, the reaction mixture was filtered to separate a solid, which was washed three times with 50 ml of n-heptane. Successively, the solid was mixed with 45 ml of n-heptane, and a solution of 2.48 ml of titanium tetrachloride in 10 ml of n-heptane was added dropwise thereto. The mixture was stirred at room temperature for 1 hour. After the reaction was over, the reaction mixture was filtered to separate a solid, which was washed three times with 50 ml of hexane, and thereafter dried at room temperature for 2 hours under reduced pressure, thereby obtaining a solid catalyst component (VI). The Ti content in the solid catalyst component (VI) was found to be 0.43 mmol/g.

(2) Ethylene/butene-1 Copolymerization

Example 1 (3) was repeated, except that the amount of hydrogen was changed to 1.5 kg/cm$^2$, and 4.5 mg of the solid catalyst component (VI) was used in place of the solid catalyst component (I).

As a result, 9.5 g of ethylene/butene-1 copolymer was obtained. With respect to the copolymer obtained, SCB, MFR, MFRR and CXS were found to be 17.44 (/1000 C.), 0.74 (g/10 min.), 27.8 and 4.8 wt %, respectively. The powder properties of the copolymer obtained were found to be superior.

EXAMPLE 7

(1) Production of Solid Catalyst Component

In a 300 ml round bottle flask thoroughly purged with nitrogen gas and equipped with a stirrer, 8.2 g of the ethylene/acrylic acid copolymer washed in a manner similar to that of Example 5 (1) and 164 ml of n-heptane were fed, and 25 ml of a n-heptane solution of 32.8 mmol of n-butylethylmagnesium was added dropwise thereto at room temperature over 10 minutes. The mixture was stirred at 40° C. for 2 hours. After the reaction was over, the reaction mixture was filtered to separate a solid, which was washed three times with 160 ml of n-heptane. Successively, the solid was mixed with 164 ml of n-heptane, and a solution of 9.02 ml of titanium tetrachloride in 20 ml of n-heptane was added dropwise thereto. The mixture was stirred at room temperature for 1 hour. After the reaction was over, the reaction mixture was filtered to separate a solid, which was washed three times with 160 ml of hexane, and thereafter dried at room temperature for 2 hours under reduced pressure, thereby obtaining a solid. The Ti content in the solid was found to be 0.23 mmol/g.

In a 300 ml round bottle flask thoroughly purged with nitrogen gas and equipped with a stirrer, 8.9 g of the above solid and 178 ml of n-heptane were fed. Successively, 63 μl of 2-tert-butylphenol was fed therein, and the mixture was stirred at room temperature for 1 hours. After the reaction was over, the reaction mixture was filtered to separate a solid, which was washed three times with 50 ml of n-hexane, and thereafter dried at room temperature for 2 hours under reduced pressure, thereby obtaining a solid catalyst component (VII). The Ti content in the solid catalyst component (VII) was found to be 0.16 mmol/g.

(2) Ethylene/butene-1 Copolymerization

Example 1 (3) was repeated, except that the amount of hydrogen was changed to 2.0 kg/cm$^2$, and 5.9 mg of the solid catalyst component (VII) was used in place of the solid catalyst component (I).

As a result, 4.4 g of ethylene/butene-1 copolymer was obtained. With respect to the copolymer obtained, SCB, MFR, MFRR and CXS were found to be 23.20 (/1000 C.), 1.0 (g/10 min.), 27 and 7.4 wt %, respectively. The powder properties of the copolymer obtained were found to be superior.

EXAMPLE 8

(1) Production of Solid Catalyst Component

In a 500 ml round bottle flask thoroughly purged with nitrogen gas and equipped with a stirrer, 11.8 g of the ethylene/acrylic acid copolymer washed in a manner similar to that of Example 5 (1) and 236 ml of n-heptane were fed, and 60 ml of a n-heptane solution of 47.2 mmol of n-butylethylmagnesium was added dropwise thereto at room temperature over 45 minutes. The mixture was stirred at 40° C. for 2 hours. After the reaction was over, the reaction mixture was filtered to separate a solid, which was washed once with 200 ml of n-heptane and additionally two times with 200 ml of toluene. Successively, the solid was mixed with 236 ml of toluene, and a solution of 13 ml of titanium tetrachloride in 50 ml of toluene was added dropwise thereto over 45 minutes. The mixture was stirred at room temperature for 1 hour. After the reaction was over, the reaction mixture was filtered to separate a solid, which was washed once with 50 ml of toluene, and additionally twice with hexane, and thereafter dried at room temperature for 2 hours under reduced pressure, thereby obtaining a solid catalyst component (VIII). The Ti content in the solid catalyst component (VIII) was found to be 0.26 mmol/g.

In a 300 ml round bottle flask thoroughly purged with nitrogen gas and equipped with a stirrer, 1.27 g of the above solid catalyst component (VIII) and 60 ml of n-heptane were fed. Successively, 25.2 μl of 2-tert-butylphenol was fed therein, and the mixture was stirred at room temperature for 1 hour. After the reaction was over, the reaction mixture was filtered to separate a solid, which was washed three times with 50 ml of n-hexane, and thereafter dried at room temperature for 2 hours under reduced pressure, thereby obtaining a solid catalyst component (IX). A Ti content in the solid catalyst component (IX) was found to be 0.38 mmol/g.

(2) Ethylene/butene-1 Copolymerization (1)

Example 1 (3) was repeated, except that the amounts of butene-1, n-butane and hydrogen were changed to 22 g, 78 g and 2.0 kg/cm$^2$, respectively, and 13.5 mg of the solid catalyst component (VIII) was used in place of the solid catalyst component (I).

As a result, 9.8 g of ethylene/butene-1 copolymer was obtained. With respect to the copolymer obtained, SCB, MFR, MFRR and CXS were found to be 17.87 (/1000 C.), 1.16 (g/10 min.), 28.6 and 4.8 wt %, respectively. The powder properties of the copolymer obtained were found to be superior.

(3) Ethylene/butene-1 Copolymerization (2)

Example 1 (3) was repeated, except that the amounts of butene-1, n-butane and hydrogen were changed to 22 g, 78 g and 2.0 kg/cm$^2$, respectively, and 8.2 mg of the solid catalyst component (IX) was used in place of the solid catalyst component (I).

As a result, 5.2 g of ethylene/butene-1 copolymer was obtained. With respect to the copolymer obtained, SCB, MFR, MFRR and CXS were found to be 19.20 (/1000 C.), 0.83 (g/10 min.), 25.6 and 3.9 wt %, respectively. The powder properties of the copolymer obtained were found to be superior.

Comparative Example 1

(1) Washing of Polymer Particles

In a 2 liter round bottle separable flask, 10 g of an ethylene/acrylic acid copolymer (average particle size: 28 μm, standard deviation of particle distribution: 15 μm, trade mark:FLOW BEADS, manufactured by Sumitomo Seika Chemicals Co., acrylic acid content: 7.0% by weight,) and 1 liter of xylene were fed, and refluxed for 6 hours under heating to dissolve the copolymer. Two liters of methanol were placed in advance in a mixer, and a half 500 ml of the resulting xylene solution and the remaining half thereof were dividedly introduced in the methanol in a hot state. The resulting slurry of polymer fine powder was filtered with a Buchner funnel, and the polymer fine powder recovered was placed in a 500 ml round bottom flask purged with nitrogen gas. 200 ml of dried acetone was added thereto, and the mixture was stirred at room temperature for 10 minutes. The acetone slurry was filtered to separate white fine particles of the polymer. In the round bottom flask, the polymer particles separated and 200 ml of acetone were fed and treated again in the same manner as above. The polymer particles recovered were dried at 40° C. for 3 hours under reduced pressure.

(2) Production of Solid Catalyst Component

In a 100 ml round bottle flask thoroughly purged with nitrogen gas and equipped with a stirrer, 1.9 g of the ethylene/acrylic acid copolymer prepared in the above step and 38 ml of n-heptane were fed, and 15 ml of a n-heptane solution of 7.6 mmol of n-butylethylmagnesium was added dropwise thereto over 15 minutes. The mixture was stirred at 40° C. for 2 hours. After the reaction was over, the reaction mixture was filtered to separate a solid, which was washed three times with 40 ml of n-heptane. Successively, the solid was mixed with 40 ml of n-heptane, and a solution of 2.1 ml of titanium tetrachloride in 20 ml of n-heptane was added dropwise thereto over 15 minutes. The mixture was stirred at room temperature for 1 hour. After the reaction was over, the reaction mixture was filtered to separate a solid, which was washed three times with 40 ml of n-hexane, and thereafter dried at room temperature for 2 hours under reduced pressure, thereby obtaining a solid catalyst component (A). The Ti content in the solid catalyst component (A) was found to be 5.33 mmol/g.

(3) Ethylene/butene-1 Copolymerization Example 1 (3) was repeated, except that the amounts of butene-1, n-butane and hydrogen were changed to 15 g, 85 g and 1.5 kg/cm$^2$, and 1.6 mg of the solid catalyst component (A) was used in place of the solid catalyst component (I).

As a result, 19.8 g of ethylene/butene-1 copolymer was obtained. With respect to the copolymer obtained, SCB, MFR, MFRR and CXS were found to be 15.8 (/1000 C.), 0.58 (g/10 min.), 33.2 and 6.8 wt %, respectively. It was microscopically confirmed that the resulting copolymer had a non-spherical shape having fine whiskers, and the powder properties thereof were found to be not superior.

Comparative Example 2

(1) Production of Solid Catalyst Component

In a 100 ml round bottle flask thoroughly purged with nitrogen gas and equipped with a stirrer, 1.75 g of the ethylene/acrylic acid copolymer prepared in Comparative Example 1 (1) and 35 ml of n-heptane were fed, and 15 ml of a n-heptane solution of 0.7 mmol of n-butylethylmagnesium was added dropwise thereto at room temperature over 15 minutes. The mixture was stirred at 40° C. for 2 hours. After the reaction was over, the reaction mixture was filtered to separate a solid, which was washed three times with 40 ml of n-heptane. Successively, the solid was mixed with 35 ml of n-heptane, and a solution of 0.19 ml of titanium tetrachloride in 10 ml of n-heptane was added dropwise thereto over 15 minutes. The mixture was stirred at room temperature for 1 hour. After the reaction was over, the reaction mixture was filtered to separate a solid, which was washed three times with 40 ml of n-hexane, and thereafter dried at room temperature for 2 hours under reduced pressure, thereby obtaining a solid catalyst component (B). The Ti content in the solid catalyst component (B) was found to be 0.53 mmol/g.

(2) Ethylene/butene-1 Copolymerization

Example 1 (3) was repeated, except that the amounts of butene-1, n-butane and hydrogen was changed to 18 g, 82 g and 1.2 kg/cm$^2$, and 2.4 mg of the solid catalyst component (B) was used in place of the solid catalyst component (I).

As a result, 7.3 g of ethylene/butene-1 copolymer was obtained. With respect to the copolymer obtained, SCB, MFR, MFRR and CXS were found to be 18.59 (/1000 C.), 1.68 (g/10 min.), 29.4 and 6.9 wt %, respectively.

Comparative Example 3

(1) Washing of Polymer Particles

The washing was carried out according to Comparative Example 1 (1), except that an ethylene/acrylic acid copolymer having an average particle size of 11 μm and a standard deviation of particle distribution of 5 μm, (trade mark-:FLOW BEADS, manufactured by Sumitomo Seika Chemicals Co., acrylic acid content: 7.0% by weight,) were used.

(2) Production of Solid Catalyst Component

In a 100 ml round bottle flask thoroughly purged with nitrogen gas and equipped with a stirrer, 2.0 g of the ethylene/acrylic acid copolymer prepared in the above step and 40 ml of n-heptane were fed, and 15 ml of a n-heptane solution of 8.0 mmol of n-butylethylmagnesium was added dropwise thereto at room temperature over 15 minutes. The mixture was stirred at 40° C. for 2 hours. After the reaction was over, the reaction mixture was filtered to separate a solid, which was washed three times with 40 ml of n-heptane. Successively, the solid was mixed with 40 ml of n-heptane, and a solution of 2.2 ml of titanium tetrachloride in 15 ml of n-heptane was added dropwise thereto over 15 minutes. The mixture was stirred at room temperature for 1 hour. After the reaction was over, the reaction mixture was filtered to separate a solid, which was washed three times with 40 ml of n-hexane, and thereafter dried at room temperature for 2 hours under reduced pressure, thereby obtaining a solid catalyst component (C). The Ti content in the solid catalyst component (C) was found to be 5.12 mmol/g.

(3) Ethylene/butene-1 Copolymerization

Example 1 (3) was repeated, except that the amounts of butene-1, n-butane and hydrogen were changed to 17 g, 83 g and 1.8 kg/cm$^2$, and 2.3 mg of the solid catalyst component (C) was used in place of the solid catalyst component (I).

As a result, 21 g of ethylene/butene-1 copolymer was obtained. With respect to the copolymer obtained, SCB, MFR, MFRR and CXS were found to be 22.26 (/1000 C.), 3.08 (g/10 min.), 33.9 and 12.8 wt %, respectively.

EXAMPLE 9

(1) Production of Solid Catalyst Component

In a 100 ml round bottle flask thoroughly purged with nitrogen gas and equipped with a stirrer, 2.0 g of an ethylene/acrylic acid copolymer having an average particle size of 28 μm and a standard deviation of particle distribution of 15 μm, (trade mark:FLOW BEADS, manufactured by Sumitomo Seika Chemicals Co., acrylic acid content: 7.0% by weight,) and 40 ml of n-heptane were fed, and 15 ml of a n-heptane solution of 8.0 mmol of n-butylethylmagnesium was added dropwise thereto at room temperature over 30 minutes. The mixture was stirred at 40° C. for 2 hours. After the reaction was over, the reaction mixture was filtered to separate a solid, which was washed three times with 40 ml of n-heptane. Successively, the solid was mixed with 40 ml of n-heptane, and a solution of 2.2 ml of titanium tetrachloride in 20 ml of n-heptane was added dropwise thereto. The mixture was stirred at room temperature for 1 hour. After the reaction was over, the reaction mixture was filtered to separate a solid, which was washed three times with 40 ml of hexane, and thereafter dried at room temperature for 2 hours under reduced pressure, thereby obtaining a solid catalyst component (X). A Ti content in the solid catalyst component (X) was found to be 0.15 mmol/g.

(2) Ethylene/butene-1 Copolymerization

Example 1 (3) was repeated, except that the amounts of butene-1, n-butane and hydrogen were changed to 22 g, 78 g and 2.0 kg/cm$^2$, and 25.5 mg of the solid catalyst component (X) was used in place of the solid catalyst component (I).

As a result, 9.2 g of ethylene/butene-1 copolymer was obtained. With respect to the copolymer obtained, SCB, MFR, MFRR and CXS were found to be 17.92 (/1000 C.), 0.64 (g/10 min.), 30.7 and 4.9 wt %, respectively. The powder properties of the copolymer obtained were found to be superior.

What is claimed is:

1. A solid catalyst component for olefin polymerization, which is obtained by contacting:
   (a) a carrier comprising carboxyl group-carrying polymer particles having an average particle size of from about 1 to 200 μm, and a standard deviation of particle size distribution of from about 1 to 30 μm,
   (b) an organometallic compound of the number 1, 2 or 13 group of metals in the periodic table of elements, and
   (c) a transition metal compound of the number 4 group of metals in the periodic table of elements,
   wherein the carboxyl group-carrying polymer particles comprise particles having a spherical or elliptical shape.

2. The solid catalyst component according to claim 1, wherein the carrier is obtained by a process that comprises the step of washing the carboxyl group-carrying polymer particles having an average particle size of from about 1 to 200 μm with an organic solvent.

3. The solid catalyst component according to claim 1, wherein the carrier is obtained by a process that comprises the steps of mixing the carboxyl group-carrying polymer particles having an average particle size of from about 1 to 200 μm with an organic solvent to form a slurry, separating the polymer particles from the slurry by filtration and drying the polymer particles separated.

4. A process for producing a solid catalyst component, which comprises the step of contacting:
   (a) a carrier comprising carboxyl group-carrying polymer particles having an average particle size of from about 1 to 200 μm, and a standard deviation of particle distribution of from about 1 to 30 μm,
   (b) an organometallic compound of the number 1, 2 or 13 group of metals in the periodic table of elements,
   (c) a transition metal compound of the number 4 group of metals in the periodic table of elements, and
   (d) a phenol compound;
   wherein the carboxyl group-carrying polymer particles comprise particles having a spherical or elliptical shape.

5. A catalyst for olefin polymerization, which is obtained by combining a solid catalyst component and at least one compound selected from the group consisting of organoaluminum compunds and organoaluminumoxy compounds; wherein the solid catalyst component is obtained by contacting:
   (a) a carrier comprising carboxyl group-carrying polymer particles having an average particle size of from about 1 to 200 μm, and a standard deviation of from about 1 to 30 μm,
   (b) an organometallic compound of the number 1, 2 or 13 group of metals in the periodic table of elements,
   (c) a transition metal compound of the number 4 group of metals in the periodic table of elements, and
   (d) a phenol compound;
   wherein the carboxyl group-carrying polymer particles comprise particles having a spherical or elliptical shape.

6. The solid catalyst according to claim 1, wherein the carboxyl group-carrying polymer is (i) a copolymer containing carboxyl group-carrying unsaturated monomer units or (ii) a polymer to which a carboxyl group is introduced by a chemical or physical modification.

7. The solid catalyst component according to claim 1, wherein the carboxyl group-carrying polymer particles contain a copolymer obtained by polymerizing (i) ethylene, propylene or styrene monomer with (ii) a carboxyl group-carrying unsaturated monomer.

8. The solid catalyst component according to claim 1, wherein the carboxyl group-carrying polymer particles contain a copolymer obtained by polymerizing ethylene monomer with acrylic acid monomer.

9. The solid catalyst component according to claim 1, wherein the organometallic compound is an organomagnesium compound.

10. The solid catalyst component according to claim 1, wherein the transition metal compound is a titanium compound represented by the following formula, $$Ti(OR)_nX_{4-n}$$

wherein R is an alkyl group having 1 to 4 carbon atoms, X is a chlorine, bromine or iodine atom, and n is 0 or an integer of from 1 to 3.

11. A catalyst for olefin polymerization, which is obtained by combining a solid catalyst component and at least one compound selected from the group consisting of organoaluminum compounds and organoaluminumoxy compounds; wherein the solid catalyst component is obtained by contacting:
   (a) a carrier comprising carboxyl group-carrying polymer particles having an average particle size of from about 1 to 200 μm, and a standard deviation of particle size distribution of from about 1 to 30 μm,
   (b) an organometallic compound of the number 1, 2 or 13 group of metals in the periodic table of elements, and
   (c) a transition metal compound of the number 4 group of metals in the periodic table of elements;
   wherein the carboxyl group-carrying polymer particles comprise particles having a spherical or elliptical shape.

12. A solid catalyst component for olefin polymerization, which is obtained by contacting:
   (a) a carrier comprising carboxyl group-carrying polymer particles having an average particle size of from about 1 to 200 μm, and a standard deviation of particle size distribution of from about 1 to 30 μm,
   (b) an organometallic compound of the number 1, 2 or 13 group of metals in the periodic table of elements,
   (c) a transition metal compound of the number 4 group of metals in the periodic table of elements, and
   (d) a phenol compound;
   wherein the carboxyl group-carrying polymer particles comprise particles having a spherical or elliptical shape.

13. The solid catalyst component according to claim 12, wherein the transition metal compound of the number 4 group of metals in the periodic table of elements is a titanium compound represented by the following formula, $$Ti(OR)_nX_{4-n}$$

wherein Ti is a titanium atom, O is an oxygen atom, R is an alkyl group having 1 to 4 carbon atoms, X is a chlorine, bromine or iodine atom, and n is 0 or an integer of from 1 to 3.

14. The solid catalyst component according to claim 12, wherein the organometallic compound of the number 1, 2 or 13 group of metals in the periodic table of elements is an organomagnesium compound.

15. The solid catalyst component according to claim 12, wherein the carboxyl group-carrying polymer particles contain a copolymer obtained by polymerizing ethylene monomer with acrylic acid monomer.

16. The solid catalyst component according to claim 12, wherein the carrier is obtained by a process that comprises the step of washing the carboxyl group-carrying polymer particles having an average particle size of from 1 to 200 $\mu$m with an organic solvent.

17. The solid catalyst component according to claim 12, wherein the carrier is obtained by a process that comprises the steps of mixing the carboxyl group-carrying polymer particles having an average particle size of from about 1 to 200 $\mu$m with an organic solvent to form a slurry, separating the polymer particles from the slurry by filtration and drying the polymer particles separated.

18. The solid catalyst component according to claim 12, wherein the carboxyl group-carrying polymer particles contain a copolymer obtained by polymerizing (i) ethylene, propylene or styrene monomer with (ii) a carboxyl group-carrying unsaturated monomer.

19. The solid catalyst according to claim 12, wherein the carboxyl group-carrying polymer is (i) a copolymer containing carboxyl group carrying unsaturated monomer units or (ii) a polymer to which a carboxyl group is introduced by a chemical or physical modification.

20. A process for producing a solid catalyst component, which comprises a step of contacting:

(a) a carrier comprising carboxyl group-carrying polymer particles having an average particle size of from about 1 to 200 $\mu$m, and a standard deviation of particle distribution of from about 1 to 30 $\mu$m, (b) an organometallic compound of the number 1, 2 or 13 group of metals in the periodic table of elements, and (c) a transition metal compound of the number 4 group of metals in the periodic table of elements;

wherein the carboxyl group-carrying polymer particles comprise particles having a spherical or elliptical shape.

* * * * *